(12) United States Patent
Meyer et al.

(10) Patent No.: US 11,956,059 B2
(45) Date of Patent: Apr. 9, 2024

(54) COMMUNICATION VIA MULTIPLE RECONFIGURABLE INTELLIGENT SURFACES

(71) Applicant: Apple Inc., Cupertino, CA (US)

(72) Inventors: Stefan Meyer, Hoechstadt (DE); Jan K Ellenbeck, Gruenwald (DE); Bertram R Gunzelmann, Koenigsbrunn (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/944,935

(22) Filed: Sep. 14, 2022

(65) Prior Publication Data

US 2024/0088987 A1 Mar. 14, 2024

(51) Int. Cl.
  *H04B 7/145* (2006.01)
  *H04B 7/0426* (2017.01)
  *H04B 7/06* (2006.01)

(52) U.S. Cl.
  CPC .............. *H04B 7/145* (2013.01); *H04B 7/043* (2013.01); *H04B 7/0617* (2013.01)

(58) Field of Classification Search
  CPC ....... H04B 7/145; H04B 7/043; H04B 7/0617
  USPC ...................................................... 375/262
  See application file for complete search history.

(56) References Cited

U.S. PATENT DOCUMENTS

| | | | |
|---|---|---|---|
| 2021/0302561 A1* | 9/2021 | Bayesteh | ............ G01S 13/765 |
| 2023/0198605 A1* | 6/2023 | Alkhateeb | .......... H04B 7/15507 370/315 |

OTHER PUBLICATIONS

Qingqing Wu et al., Intelligent Reflecting Surface Aided Wireless Communications: A Tutorial, IEEE Transactions on Communications, Downloaded Mar. 1, 2021, pp. 1-29, IEEE.

C. Mukherjee et al., First Uni-Traveling Carrier Photodiode Compact Model Enabling Future Terahertz Communication System Design, Downloaded Mar. 4, 2021, pp. 150-153, IEEE.

L. Zhang et al., Space-Time-Coding Digital Metasurfaces, 13th International Congress on Artificial Materials for Novel Wave Phenomena—Metamaterials, Sep. 16, 2019-Sep. 21, 2019, pp. x-128-x-130, IEEE, Rome, Italy.

Ming Che et al., Optoelectronic THz-Wave Beam Steering by Arrayed Photomixers With Integrated Antennas, IEEE Photonics Technology Letters, Aug. 15, 2020, pp. 979-982, vol. 32, No. 16, IEEE.

Xiaoshen Song et al., Fully- / Partially-Connected Hybrid Beamforming Architectures for mmWave MU-MIMO, pp. 1-16, IEEE.

(Continued)

*Primary Examiner* — Fitwi Y Hailegiorgis
(74) *Attorney, Agent, or Firm* — Treyz Law Group, P.C.; Michael H. Lyons

(57) ABSTRACT

A communication system may include an access point (AP), a user equipment (UE), and a communication path between the AP and the UE having a series of reconfigurable intelligent surfaces (RIS's). Each RIS may have a first beam pointing to a previous node and a second beam pointing to a next node in the communication path. Beams of routing RIS's and a beam from an end user RIS towards a last routing RIS may be set during calibration. The UE may perform beam discovery with the end user RIS. The UE and the AP may convey wireless data via reflections off each of the RIS's in the communication path. The beam of the end user RIS may be updated to track the UE device while the other the beams remain fixed. The beams may be calibrated using retroreflection and beam variation for each pair of RIS's up the communication path.

20 Claims, 7 Drawing Sheets

(56) References Cited

OTHER PUBLICATIONS

Cyril C. Renaud et al., Antenna Integrated THz Uni-Traveling Carrier Photodiodes, IEEE Journal of Selected Topics in Quantum Electronics, Mar./Apr. 2018, pp. 1-11, vol. 24, No. 2, IEEE.
Michele Natrella et al., Accurate equivalent circuit model for millimetre-wave UTC photodiodes, Feb. 25, 2016, pp. 1-16, vol. 24, No. 5, Optics Express.
Xilong Pei et al., RIS-Aided Wireless Communications: Prototyping, Adaptive Beamforming, and Indoor/Outdoor Field Trials, Feb. 28, 2021, pp. 1-13.
Chhandak Mukherjee et al., Efficient compact modelling of UTC-photodiode towards terahertz communication system design, Solid-State Electronics, 2020, pp. 1-11, HAL.
U.S. Appl. No. 17/827,290, filed May 27, 2022.
U.S. Appl. No. 17/834,695, filed Jun. 7, 2022.

* cited by examiner

COMMUNICATION VIA MULTIPLE RECONFIGURABLE INTELLIGENT SURFACES

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. As the frequency of the radio-frequency signals increases, it can become increasingly difficult to perform satisfactory wireless communications because the signals become subject to significant over-the-air attenuation and typically require line-of-sight.

SUMMARY

A communication system may include a wireless access point (AP), a user equipment (UE) device, and a communication path between the AP and the UE device. The communication path may include a series of reconfigurable intelligent surfaces (RIS's) arranged in a relay or chained pattern. The RIS's and the AP may be installed in an environment. The RIS's may include an end user RIS that is closes to the UE device and routing RIS's between the end user RIS and the AP.

Each RIS may have a first signal beam that points to a previous node in the communication path and a second signal beam that points to a next node in the communication path. The signal beams of the routing RIS's and the signal beam of the end user RIS that points towards the last routing RIS may be identified and set during calibration. When the UE device enters the system, the UE device performs a beam discovery with the end user RIS. The beam discovery may discover a signal beam of the UE pointed towards the end user RIS and a second signal beam of the end user RIS pointed towards the UE. The UE device and the AP may convey wireless data via reflections off each of the RIS's in the communication path in series. The signal beam of the end user RIS may be updated to track the UE device as it moves and/or the end user RIS may be updated. The signal beams of the routing RIS and the signal beam from the end user RIS to the routing RIS may remain fixed in place after initial set up and calibration.

The calibration may involve mapping the environment and identifying optimal locations for the RIS's in the mapped environment. The placement of the RIS's may deviate from optimal locations. To mitigate this, a calibration device may perform an initial calibration to identify and set each of the signal beams of the communication path to point towards the next and previous nodes in the communication path. The calibration device may control a first RIS to point one signal beam towards the calibration device and another signal beam towards the optimal location of the previous RIS in the communication path. The calibration device may control the previous RIS to point both its signal beams towards the optimal location of the first RIS. The UE device may transmit to the first RIS and may measure reflected signal power while instructing the first RIS and the previous RIS to vary their beams. The UE device may identify the beams that produced peak reflected signal power as calibrated beams and may configure the first RIS and the previous RIS to use those calibrated beams during subsequent data transfer. The UE device may repeat this calibration with every pair of RIS's in the communication path up to the AP.

An aspect of the disclosure provides a method of operating a first electronic device to communicate with a second electronic device. The method can include instructing a first reconfigurable intelligent surface (RIS) to form a first signal beam oriented towards the first electronic device. The method can include while the first RIS forms the first signal beam, transmitting wireless data via a first reflection, off the first RIS and towards a second RIS, and via a second reflection, off the second RIS and towards the second electronic device.

An aspect of the disclosure provides a method of operating a communication system to route wireless data between a wireless access point and a user equipment device. The method can include with a first reconfigurable intelligent surface (RIS), reflecting the wireless data from a first signal beam onto a second signal beam, the second signal beam oriented towards a second RIS. The method can include with the second RIS, reflecting the wireless data from a third signal beam onto a fourth signal beam, the third signal beam oriented towards the first RIS.

An aspect of the disclosure provides a method of operating an electronic device. The method can include transmitting a first control signal that configures a first reconfigurable intelligent surface (RIS) to concurrently form a first signal beam pointed towards the electronic device and a second signal beam pointed in a first direction. The method can include transmitting a second control signal that configures a second RIS to concurrently form a third signal beam pointed in a second direction and a fourth signal beam pointed in the second direction, the second direction being different from the first direction. The method can include transmitting, using a fifth signal beam pointed towards the first RIS, a radio-frequency signal. The method can include receiving, using the fifth signal beam pointed towards the first RIS, a reflected signal associated with the radio-frequency signal.

DETAILED DESCRIPTION

Figure 1:
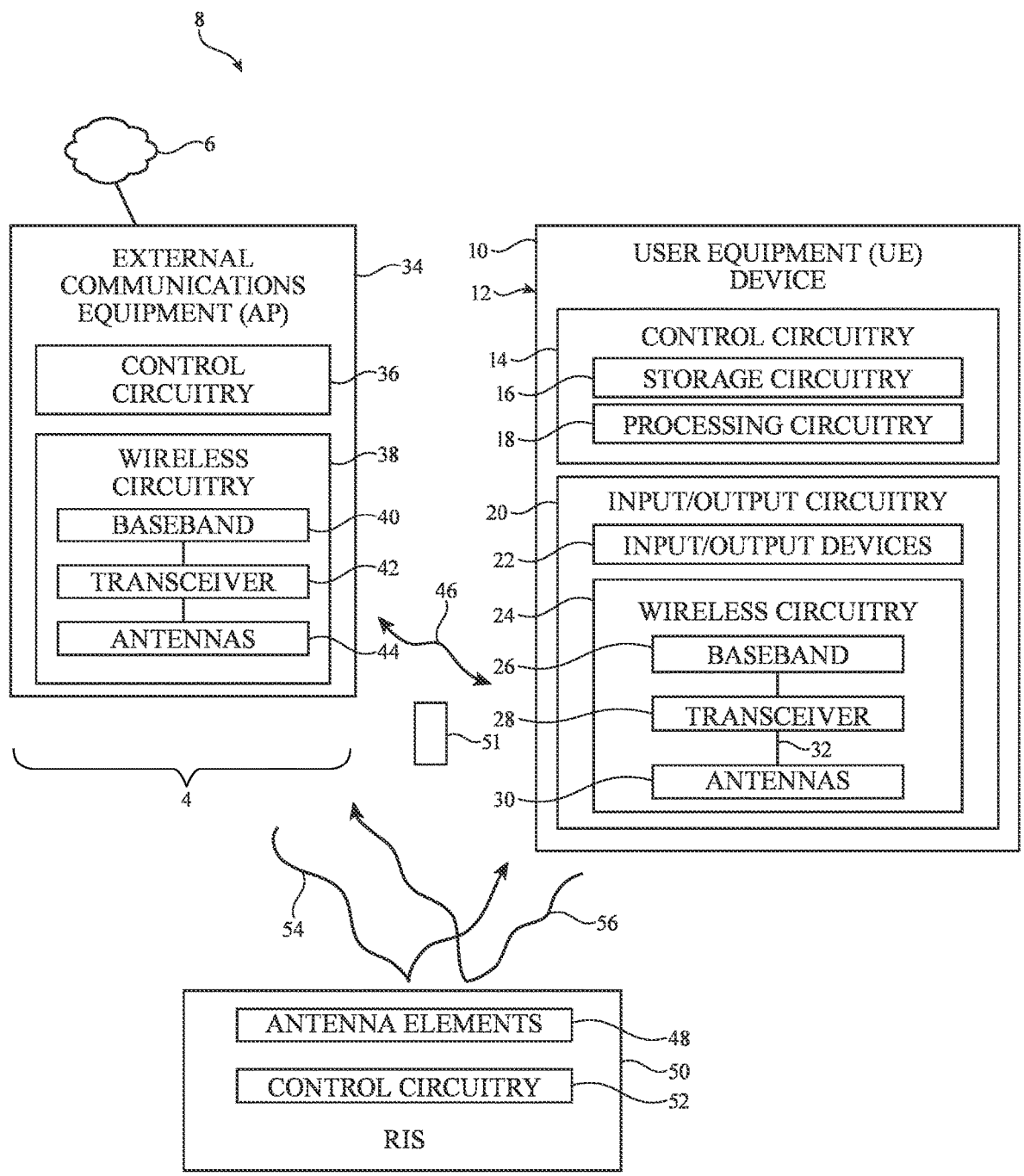
FIG. 1 is a schematic block diagram of an illustrative communications system having a user equipment (UE) device, external communications equipment, and a reconfigurable intelligent surface (RIS) in accordance with some embodiments.

FIG. 1 is a schematic diagram of an illustrative communications system 8 (sometimes referred to herein as communications network 8) for conveying wireless data between communications terminals. Communications system 8 may include network nodes (e.g., communications terminals). The network nodes may include user equipment (UE) such as one or more UE devices 10. The network nodes may also include external communications equipment (e.g., communications equipment other than UE devices 10) such as external communications equipment 34. External communications equipment 34 (sometimes referred to herein simply as external equipment 34) may include one or more electronic devices and may be a wireless base station, wireless access point, or other wireless equipment for example. An implementation in which external communications equipment 34 forms a wireless access point (AP) is described herein as an example. External communications equipment 34 may therefore sometimes be referred to herein as AP 34. UE device 10 and AP 34 may communicate with each other using one or more wireless communications links. If desired, UE devices 10 may wirelessly communicate with AP 34 without passing communications through any other intervening network nodes in communications system 8 (e.g., UE devices 10 may communicate directly with AP 34 over-the-air).

AP 34 may be communicably coupled to one or more other network nodes 6 in a larger communications network 4 via wired and/or wireless links. Network 4 may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. Network 4 may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE devices 10 may send data to and/or may receive data from other nodes or terminals in network 4 via AP 34 (e.g., AP 34 may serve as an interface between user equipment devices 10 and the rest of the larger communications network). Network 4 may be managed, operated, controlled, or run by a corresponding network service provider (e.g., a cellular network carrier).

User equipment (UE) device 10 of FIG. 1 is an electronic device (sometimes referred to herein as electronic device 10 or device 10) and may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, equipment that implements the functionality of two or more of these devices, or other electronic equipment.

As shown in the functional block diagram of FIG. 1, UE device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

UE device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultrawideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

UE device 10 may include input-output circuitry 20. Input-output circuitry 20 may include input-output devices 22. Input-output devices 22 may be used to allow data to be supplied to UE device 10 and to allow data to be provided from UE device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 22 may be peripherals that are coupled to a main processing unit or other portion of UE device 10 via a wired or wireless link).

Input-output circuitry 20 may include wireless circuitry 24 to support wireless communications. Wireless circuitry 24 (sometimes referred to herein as wireless communications circuitry 24) may include baseband circuitry such as baseband circuitry 26 (e.g., one or more baseband processors and/or other circuitry that operates at baseband), radio-frequency (RF) transceiver circuitry such as transceiver 28, and one or more antennas 30. If desired, wireless circuitry 24 may include multiple antennas 30 that are arranged into a phased antenna array (sometimes referred to as a phased array antenna) that conveys radio-frequency signals within a corresponding signal beam that can be steered in different directions. Baseband circuitry 26 may be coupled to transceiver 28 over one or more baseband data paths. Transceiver 28 may be coupled to antennas 30 over one or more radio-frequency transmission line paths 32. If desired, radio-frequency front end circuitry may be disposed on radio-frequency transmission line path(s) 32 between transceiver 28 and antennas 30.

In the example of FIG. 1, wireless circuitry 24 is illustrated as including only a single transceiver 28 and a single radio-frequency transmission line path 32 for the sake of clarity. In general, wireless circuitry 24 may include any desired number of transceivers 28, any desired number of radio-frequency transmission line paths 32, and any desired number of antennas 30. Each transceiver 28 may be coupled to one or more antennas 30 over respective radio-frequency transmission line paths 32. Radio-frequency transmission line path 32 may be coupled to antenna feeds on one or more antenna 30. Each antenna feed may, for example, include a positive antenna feed terminal and a ground antenna feed terminal. Radio-frequency transmission line path 32 may have a positive transmission line signal path that is coupled to the positive antenna feed terminal and may have a ground transmission line signal path that is coupled to the ground antenna feed terminal. This example is merely illustrative and, in general, antennas 30 may be fed using any desired antenna feeding scheme.

Radio-frequency transmission line path 32 may include transmission lines that are used to route radio-frequency antenna signals within device 10. Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 32 may be integrated into rigid and/or flexible printed circuit boards. In one embodiment, radio-frequency transmission line paths such as radio-frequency transmission line path 32 may also include transmission line conductors integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In performing wireless transmission, baseband circuitry 26 may provide baseband signals to transceiver 28 (e.g., baseband signals that include wireless data for transmission). Transceiver 28 may include circuitry for converting the baseband signals received from baseband circuitry 26 into corresponding radio-frequency signals (e.g., for modulating the wireless data onto one or more carriers for transmission, synthesizing a transmit signal, etc.). For example, transceiver 28 may include mixer circuitry for up-converting the baseband signals to radio frequencies prior to transmission over antennas 30. Transceiver 28 may also include digital to analog converter (DAC) and/or analog to digital converter (ADC) circuitry for converting signals between digital and analog domains. Transceiver 28 may transmit the radio-frequency signals over antennas 30 via radio-frequency transmission line path 32. Antennas 30 may transmit the radio-frequency signals to external wireless equipment by radiating the radio-frequency signals into free space.

In performing wireless reception, antennas 30 may receive radio-frequency signals from AP 34. The received radio-frequency signals may be conveyed to transceiver 28 via radio-frequency transmission line path 32. Transceiver 28 may include circuitry for converting the received radio-frequency signals into corresponding baseband signals. For example, transceiver 28 may include mixer circuitry for down-converting the received radio-frequency signals to baseband frequencies prior to conveying the baseband signals to baseband circuitry 26 and may include demodulation circuitry for demodulating wireless data from the received signals.

Front end circuitry disposed on radio-frequency transmission line path 32 may include radio-frequency front end components that operate on radio-frequency signals conveyed over radio-frequency transmission line path 32. If desired, the radio-frequency front end components may be formed within one or more radio-frequency front end modules (FEMs). Each FEM may include a common substrate such as a printed circuit board substrate for each of the radio-frequency front end components in the FEM. The radio-frequency front end components in the front end circuitry may include switching circuitry (e.g., one or more radio-frequency switches), radio-frequency filter circuitry (e.g., low pass filters, high pass filters, notch filters, band pass filters, multiplexing circuitry, duplexer circuitry, diplexer circuitry, triplexer circuitry, etc.), impedance matching circuitry (e.g., circuitry that helps to match the impedance of antennas 30 to the impedance of radio-frequency transmission line path 32), antenna tuning circuitry (e.g., networks of capacitors, resistors, inductors, and/or switches that adjust the frequency response of antennas 30), radio-frequency amplifier circuitry (e.g., power amplifier circuitry and/or low-noise amplifier circuitry), radio-frequency coupler circuitry, charge pump circuitry, power management circuitry, digital control and interface circuitry, and/or any other desired circuitry that operates on the radio-frequency signals transmitted and/or received by antennas 30.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, baseband circuitry 26 and/or portions of transceiver 28 (e.g., a host processor on transceiver 28) may form a part of control circuitry 14. Baseband circuitry 26 may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and AP 34 (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless (radio-frequency) sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc. The sensing operations may, for example, involve the transmission of sensing signals (e.g., radar waveforms), the receipt of corresponding reflected signals (e.g., the transmitted waveforms that have reflected off of external objects), and the processing of the transmitted signals and the received reflected signals (e.g., using a radar scheme).

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, 6G bands at sub-THz or THz frequencies greater than about 100 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-100 Gbps or higher, wireless circuitry 24 may convey wireless signals at frequencies greater than about 100 GHz.

As shown in FIG. 1, wireless circuitry 24 may transmit wireless signals 46 to AP 34 and/or may receive wireless signals 46 from AP 34. Wireless signals 46 may be tremendously high frequency (THF) signals (e.g., sub-THz or THz signals) at frequencies greater than around 100 GHz (e.g., between 100 GHz and 1 THz, between 80 GHz and 10 THz, between 100 GHz and 10 THz, between 100 GHz and 2 THz, between 200 GHz and 1 THz, between 300 GHz and 1 THz, between 300 GHz and 2 THz, between 70 GHz and 2 THz, between 300 GHz and 10 THz, between 100 GHz and 800 GHz, between 200 GHz and 1.5 THz, or within any desired sub-THz, THz, TI-1F, or sub-millimeter frequency band such as a 6G frequency band), may be millimeter (mm) or centimeter (cm) wave signals between 10 GHz and around 70 GHz (e.g., 5G NR FR2 signals), or may be signals at frequencies less than 10 GHz (e.g., 5G NR FR1 signals, LTE signals, 3G signals, 2G signals, WLAN signals, Bluetooth signals, UWB signals, etc.). If desired, the high data rates supported by THF signals may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

In implementations where wireless circuitry 24 conveys THF signals, wireless circuitry may include electro-optical circuitry if desired. The electro-optical circuitry may include light sources that generate first and second optical local oscillator (LO) signals. The first and second optical LO signals may be separated in frequency by the intended frequency of wireless signals 46. Wireless data may be modulated onto the first optical LO signal and one of the optical LO signals may be provided with an optical phase shift (e.g., to perform beamforming). The first and second optical LO signals may illuminate a photodiode that produces current at the frequency of wireless signals 46 when illuminated by the first and second optical LO signals. An antenna resonating element of a corresponding antenna 30 may convey the current produced by the photodiode and may radiate corresponding wireless signals 46. This is merely illustrative and, in general, wireless circuitry 24 may generate wireless signals 46 using any desired techniques.

Antennas 30 may be formed using any desired antenna structures. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles (e.g., planar dipole antennas such as bowtie antennas), hybrids of these designs, etc. Parasitic elements may be included in antennas 30 to adjust antenna performance.

If desired, two or more of antennas 30 may be integrated into a phased antenna array (sometimes referred to herein as a phased array antenna or an array of antenna elements). Each antenna 30 in the phased antenna array forms a respective antenna element of the phased antenna array. Each antenna 30 in the phased antenna array has a respective phase and magnitude controller that imparts the radio-frequency signals conveyed by that antenna with a respective phase and magnitude. The respective phases and magnitudes may be selected (e.g., by control circuitry 14) to configure the radio-frequency signals conveyed by the antennas 30 in the phased antenna array to constructively and destructively interfere in such a way that the radio-frequency signals collectively form a signal beam (e.g., a signal beam of wireless signals 46) oriented in a corresponding beam pointing direction (e.g., a direction of peak gain).

The control circuitry may adjust the phases and magnitudes to change (steer) the orientation of the signal beam (e.g., the beam pointing direction) to point in other directions over time. This process may sometimes also be referred to herein as beamforming. Beamforming may boost the gain of wireless signals 46 to help overcome over-the-air attenuation and the signal beam may be steered over time to point towards AP 34 even as the position and orientation of UE device 10 changes. The signal beams formed by antennas 30 of UE device 10 may sometimes be referred to herein as UE beams or UE signal beams. Each UE beam may be oriented in a different respective direction (e.g., a beam pointing direction of peak signal gain). Each UE beam may be labeled by a corresponding UE beam index. UE device 10 may include or store a codebook (sometimes referred to herein as a UE codebook) that maps each of its UE beam indices to the corresponding phase and magnitude settings for each antenna 30 in a phased antenna array that configure the phased antenna array to form the UE beam associated with that UE beam index.

As shown in FIG. 1, AP 34 may also include control circuitry 36 (e.g., control circuitry having similar components and/or functionality as control circuitry 14 in UE device 10) and wireless circuitry 38 (e.g., wireless circuitry having similar components and/or functionality as wireless circuitry 24 in UE device 10). Wireless circuitry 38 may include baseband circuitry 40 and transceiver 42 (e.g., transceiver circuitry having similar components and/or functionality as transceiver circuitry 28 in UE device 10) coupled to two or more antennas 44 (e.g., antennas having similar components and/or functionality as antennas 30 in UE device 10). Antennas 44 may be arranged in one or more phased antenna arrays (e.g., phased antenna arrays that perform beamforming similar to phased antenna arrays of antennas 30 on UE device 10).

AP 34 may use wireless circuitry 38 to transmit a signal beam of wireless signals 46 to UE device 10 (e.g., as downlink (DL) signals transmitted in a downlink direction) and/or to receive a signal beam of wireless signals 46 transmitted by UE device 10 (e.g., as uplink (UL) signals transmitted in an uplink direction). The signal beams formed by antennas 44 of UE device 10 may sometimes be referred to herein as AP beams or AP signal beams. Each AP beam may be oriented in a different respective direction (e.g., a beam pointing direction of peak signal gain). Each AP beam may be labeled by a corresponding AP beam index. AP 34 may include or store a codebook (sometimes referred to herein as an AP codebook) that maps each of its AP beam indices to the corresponding phase and magnitude settings for each antenna 44 in a phased antenna array that configure the phased antenna array to form the AP beam associated with that AP beam index.

While communications at high frequencies allow for extremely high data rates (e.g., greater than 100 Gbps), wireless signals 46 at such high frequencies are subject to significant attenuation during propagation over-the-air. Integrating antennas 30 and 44 into phased antenna arrays helps to counteract this attenuation by boosting the gain of the signals within a signal beam. However, signal beams are highly directive and may require a line-of-sight (LOS) between UE device 10 and AP 34. If an external object is present between AP 34 and UE device 10, the external object may block the LOS between UE device 10 and AP 34, which can disrupt wireless communications using wireless signals 46. If desired, an reconfigurable intelligent surface (RIS) may be used to allow UE device 10 and AP 34 to continue to communicate using wireless signals 46 even when an external object blocks the LOS between UE device 10 and AP 34 (or whenever direct over-the-air communications between AP 34 and UE device 10 otherwise exhibits less than optimal performance).

As shown in FIG. 1, system 8 may include one or more reconfigurable intelligent surfaces (RIS's) such as RIS 50. RIS 50 may sometimes also be referred to as an intelligent reconfigurable surface, an intelligent reflective/reflecting surface, a reflective intelligent surface, a reflective surface, a reflective device, a reconfigurable reflective device, a reconfigurable reflective surface, or a reconfigurable surface. AP 34 may be separated from UE device 10 by a line-of-sight (LOS) path. In some circumstances, an external object such as object 51 may block the LOS path. Object 51 may be, for example, part of a building such as a wall, window, floor, or ceiling (e.g., when UE device 10 is located inside), furniture, a body or body part, an animal, a cubicle wall, a vehicle, a landscape feature, or other obstacles or objects that may block the LOS path between AP 34 and UE device 10.

In the absence of external object 51, AP 34 may form a corresponding AP beam of wireless signals 46 oriented in the direction of UE device 10 and UE device 10 may form a corresponding UE beam of wireless signals 46 oriented in the direction of AP 34. UE device 10 and AP 34 can then convey wireless signals 46 over their respective signal beams and the LOS path. However, the presence of external object 51 prevents wireless signals 46 from being conveyed over the LOS path.

RIS 50 may be placed or disposed within system 8 in such a way so as to allow RIS 50 to reflect wireless signals 46 between UE device 10 and AP 34 despite the presence of external object 51 within the LOS path. More generally, RIS 50 may be used to reflect wireless signals 46 between UE device 10 and AP 34 when reflection via RIS 50 offers superior radio-frequency propagation conditions relative to the LOS path regardless of the presence of external object 51 (e.g., when the LOS path between AP 34 and RIS 50 and the LOS path between RIS 50 and UE device 10 exhibit superior propagation/channel conditions than the direct LOS path between UE device 10 and AP 34).

When RIS 50 is placed within system 8, AP 34 may transmit wireless signals 46 towards RIS 50 (e.g., within an AP beam oriented towards RIS 50 rather than towards UE device 10) and RIS 50 may reflect the wireless signals towards UE device 10, as shown by arrow 54. Conversely, UE device 10 may transmit wireless signals 46 towards RIS 50 (e.g., within a UE beam oriented towards RIS 50 rather than towards AP 34) and RIS 50 may reflect the wireless signals towards AP 34, as shown by arrow 56.

RIS 50 is an electronic device that includes a two-dimensional surface of engineered material having reconfigurable properties for performing (e.g., reflecting) communications between AP 34 and UE device 10. RIS 50 may include an array of reflective elements such as antenna elements 48 on an underlying substrate. Antenna elements 48 may also sometimes be referred to herein as reflective elements 48, reconfigurable antenna elements 48, reconfigurable reflective elements 48, reflectors 48, or reconfigurable reflectors 48.

The substrate may be a rigid or flexible printed circuit board, a package, a plastic substrate, meta-material, or any other desired substrate. The substrate may be planar or may be curved in one or more dimensions. If desired, the substrate and antenna elements 48 may be enclosed within a housing. The housing may be formed from materials that are transparent to wireless signals 46. If desired, RIS 50 may be disposed (e.g., layered) onto an underlying electronic device. RIS 50 may also be provided with mounting structures (e.g., adhesive, brackets, a frame, screws, pins, clips, etc.) that can be used to affix or attach RIS 50 to an underlying structure such as another electronic device, a wall, the ceiling, the floor, furniture, etc. Disposing RIS 50 on a ceiling, wall, window, column, pillar, or at or adjacent to the corner of a room (e.g., a corner where two walls intersect, where a wall intersects with the floor or ceiling, where two walls and the floor intersect, or where two walls and the ceiling intersect), as examples, may be particularly helpful in allowing RIS 50 to reflect wireless signals between AP 34 and UE device 10 around various objects 51 that may be present (e.g., when AP 34 is located outside and UE device 10 is located inside, when AP 34 and UE device 10 are both located inside or outside, etc.).

RIS 50 may be a passive adaptively controlled reflecting surface and a powered device that includes control circuitry 52 that helps to control the operation of antenna elements 48 (e.g., one or more processors in control circuitry such as control circuitry 14). When electro-magnetic (EM) energy waves (e.g., waves of wireless signals 46) are incident on RIS 50, the wave is reflected by each antenna element 48 via re-radiation by each antenna element 48 with a respective phase and amplitude response. Antenna elements 48 may include passive reflectors (e.g., antenna resonating elements or other radio-frequency reflective elements). Each antenna element 48 may include an adjustable device that is programmed, set, and/or controlled by control circuitry 52 (e.g., using a control signal that includes a respective beamforming coefficient) to configure that antenna element 48 to reflect incident EM energy with the respective phase and amplitude response. The adjustable device may be a programmable photodiode, an adjustable impedance matching circuit, an adjustable phase shifter, an adjustable amplifier, a varactor diode, an antenna tuning circuit, etc.

Control circuitry 52 on RIS 50 may configure the reflective response of antenna elements 48 on a per-element or per-group-of-elements basis (e.g., where each antenna element has a respective programmed phase and amplitude response or the antenna elements in different sets/groups of antenna elements are each programmed to share the same respective phase and amplitude response across the set/group but with different phase and amplitude responses between sets/groups). The scattering, absorption, reflection, and diffraction properties of the entire RIS can therefore be changed over time and controlled (e.g., by software running on the RIS or other devices communicably coupled to the RIS such as external equipment 34 or UE device 10).

One way of achieving the per-element phase and amplitude response of antenna elements 48 is by adjusting the impedance of antenna elements 48, thereby controlling the complex reflection coefficient that determines the change in amplitude and phase of the re-radiated signal. The control circuitry 52 on RIS 50 may configure antenna elements 48 to exhibit impedances that serve to reflect wireless signals 46 incident from particular incident angles onto particular output angles. The antenna elements 48 (e.g., the antenna impedances) may be adjusted to change the angle with which incident wireless signals 46 are reflected off of RIS 50.

For example, the control circuitry on RIS 50 may configure antenna elements 48 to reflect wireless signals 46 transmitted by AP 34 towards UE device 10 (as shown by arrow 54) and to reflect wireless signals 46 transmitted by UE device 10 towards AP 34 (as shown by arrow 56). In such an example, control circuitry 36 may configure (e.g., program) a phased antenna array of antennas 44 on AP 34 to form an AP beam oriented towards RIS 50, control circuitry 14 may configure (e.g., program) a phased antenna array of antennas 30 on UE device 10 to form a UE beam oriented towards RIS 50, control circuitry 52 may configure (e.g., program) antenna elements 48 to receive and re-radiate (e.g., effectively reflect) wireless signals incident from the direction of AP 34 towards/onto the direction of UE device 10 (as shown by arrow 54), and control circuitry 52 may configure (e.g., program) antenna elements 48 to receive and re-radiate (e.g., effectively reflect) wireless signals incident from the direction of UE device 10 towards-onto the direction of external equipment 34 (as shown by arrow 56). The antenna elements may be configured using respective beamforming coefficients. Control circuitry 52 on RIS 50 may set and adjust the adjustable devices coupled to antenna elements 48 (e.g., may set and adjust the impedances of antenna elements 48) over time to reflect wireless signals 46 incident from different selected incident angles onto different selected output angles.

To minimize the cost, complexity, and power consumption of RIS 50, RIS 50 may include only the components and control circuitry required to control and operate antenna elements 48 to reflect wireless signals 46. Such components and control circuitry may include, for example, the adjustable devices of antenna elements 48 as required to change the phase and magnitude responses of antenna elements 48 (based on corresponding beamforming coefficients) and thus the direction with which RIS 50 reflects wireless signals 46. The components may include, for example, components that adjust the impedances of antenna elements 48 so that each antenna element exhibits a respective complex reflection coefficient, which determines the phase and amplitude of the reflected (re-radiated) signal produced by each antenna element (e.g., such that the signals reflected across the array constructively and destructively interfere to form a reflected signal beam in a corresponding beam pointing direction).

All other components that would otherwise be present in UE device 10 or AP 34 may be omitted from RIS 50. For example, RIS 50 does not include baseband circuitry (e.g., baseband circuitry 26 or 40) and does not include transceiver circuitry (e.g., transceiver 42 or 28) coupled to antenna elements 48. Antenna elements 48 and RIS 50 therefore do not generate wireless data for transmission, do not synthesize radio-frequency signals for transmission, and do not receive and demodulate radio-frequency signals. RIS 50 may also be implemented without a display or user input device. In other words, the control circuitry on RIS 50 may adjust antenna elements 48 to direct and steer reflected wireless signals 46 without using antenna elements 48 to perform any data transmission or reception operations and without using antenna elements 48 to perform radio-frequency sensing operations.

This may serve to minimize the hardware cost and power consumption of RIS 50. If desired, RIS 50 may also include one or more antennas (e.g., antennas separate from the antenna elements 48 used to reflect wireless signals 46) and corresponding transceiver/baseband circuitry that uses the one or more antennas to convey control signals with AP 34 or UE device 10 (e.g., using a control channel plane and control RAT). Such control signals may be used to coordinate the operation of RIS 50 in conjunction with AP 34 and/or UE device 10 but requires much lower data rates and thus much fewer processing resources and much less power than transmitting or receiving wireless signals 46. These control signals may, for example, be transmitted by UE device 10 and/or AP 34 to configure the phase and magnitude responses of antenna elements 48 (e.g., the control signals may convey beamforming coefficients). This may allow the calculation of phase and magnitude responses for antenna elements 48 to be offloaded from RIS 50, further reducing the processing resources and power required by RIS 50. In other implementations, RIS 50 may be a self-controlled RIS that includes processing circuitry for generating its own phase and magnitude responses and/or for coordinating communications among multiple UE devices (e.g., in an RIS-as-a-service configuration).

In this way, RIS 50 may help to relay wireless signals 46 between AP 34 and UE device 10 when object 51 blocks the LOS path between AP 34 and UE device 10 and/or when the propagation conditions from AP 34 to RIS 50 and from RIS 50 to UE device 10 are otherwise superior to the propagation conditions from AP 34 to UE device 10. Just a single RIS 50 may, for example, increase signal-to-interference-plus-noise ratio (SINR) for UE device 10 by as much as +20 dB and may increase effective channel rank relative to environments without an RIS. At the same time, RIS 50 only includes processing resources and consumes power required to perform control procedures, minimizing the cost of RIS 50 and maximizing the flexibility with which RIS 50 can be placed within the environment.

RIS 50 may include or store a codebook (sometimes referred to herein as a RIS codebook) that maps settings for antenna elements 48 to different reflected signal beams formable by antenna elements 48 (sometimes referred to herein as RIS beams). RIS 50 may configure its own antenna elements 48 to perform beamforming with respective beamforming coefficients (e.g., as given by the RIS codebook). The beamforming performed at RIS 50 may include two concurrently active RIS beams (e.g., where each RIS beam is generated using a corresponding set of beamforming coefficients).

In general, RIS 50 may relay (reflect) signals between two different devices. RIS 50 may form a first active RIS beam that has a beam pointing direction oriented towards the first device (sometimes referred to here as a RIS-AP beam when the first device is AP 34) and may concurrently form a second active RIS beam that has a beam pointing direction oriented towards the second device (sometimes referred to herein as a RIS-UE beam when the second device is UE device 10). In this way, when wireless signals 46 are incident from the first device (e.g., AP 34) within the first RIS beam, the antenna elements 48 on RIS 50 may receive the wireless signals incident from the direction the first device (e.g., AP 34) and may re-radiate (e.g., effectively reflect) the incident wireless signals within the second RIS beam and towards the direction of the second device (e.g., UE device 10). Conversely, when wireless signals 46 are incident from the second device (e.g., UE device 10) within the second RIS beam, the antenna elements 48 on RIS 50 may receive the wireless signals incident from the direction the second device (e.g., UE device 10) and may re-radiate (e.g., effectively reflect) the incident wireless signals within the first RIS beam and towards the direction of the first device (e.g., AP 34).

While referred to herein as "beams," the first RIS beam and the second RIS beams formed by RIS 50 do not include signals/data that are actively transmitted by RIS 50 but instead correspond to the impedance, phase, and/or magnitude response settings (e.g., reflection coefficients) for antenna elements 48 that shape the reflected signal beam of wireless signals 46 from a corresponding incident direction/angle onto a corresponding output direction/angle (e.g., the first RIS beam may be effectively formed using a first set of beamforming coefficients and the second RIS beam may be effectively formed using a second set of beamforming coefficients but are not associated with the active transmission of wireless signals by RIS 50).

Figure 2:
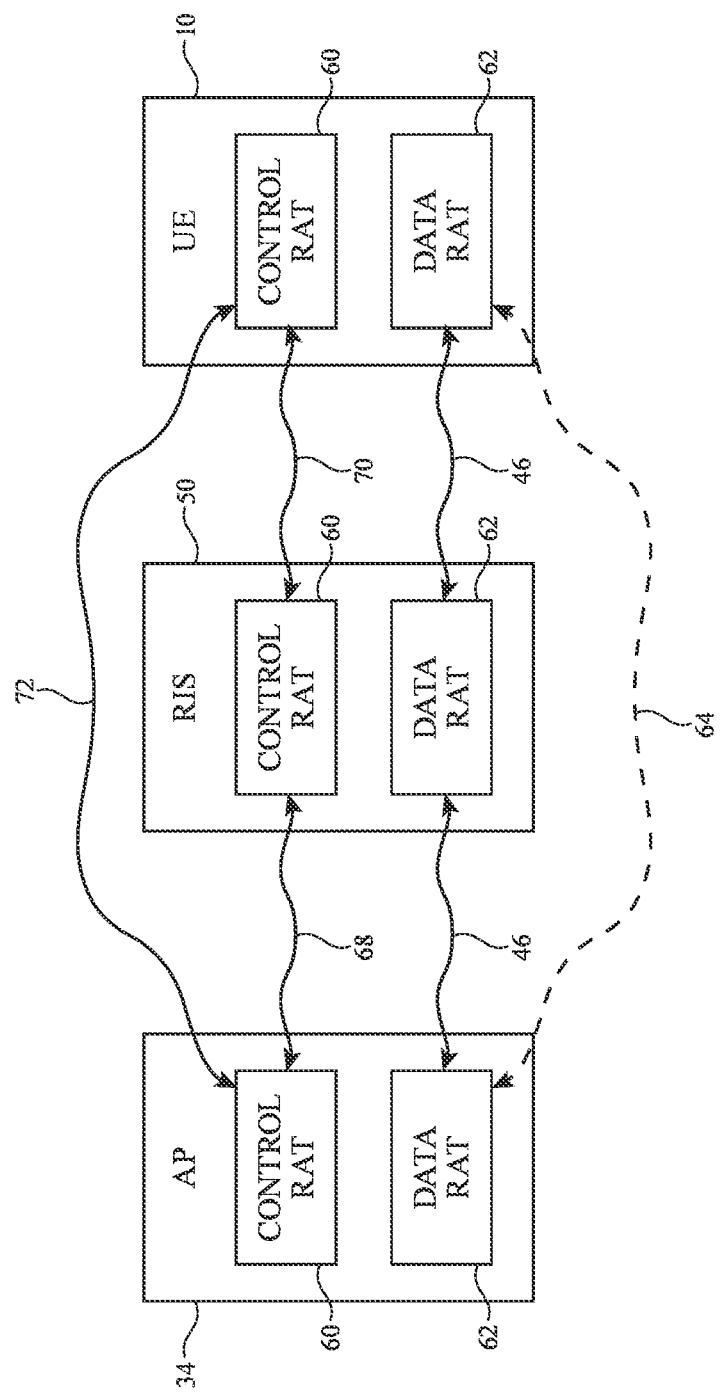
FIG. 2 is a diagram showing how an illustrative wireless access point, RIS, and user equipment device may communicate using both a data transfer radio access technology (RAT) and a control RAT in accordance with some embodiments.

FIG. 2 is a diagram showing how AP 34, RIS 50, and UE device 10 may communicate using both a control RAT and a data transfer RAT for establishing and maintaining communications between AP 34 and UE device 10 via RIS 50. As shown in FIG. 2, AP 34, RIS 50, and UE device 10 may each include wireless circuitry that operates according to a data transfer RAT 62 (sometimes referred to herein as data RAT 62) and a control RAT 60. Data RAT 62 may be a sub-THz communications RAT such as a 6G RAT that performs wireless communications at the frequencies of wireless signals 46. Control RAT 60 may be associated with wireless communications that consume much fewer resources and are less expensive to implement than the communications of data RAT 62. For example, control RAT 60 may be Wi-Fi, Bluetooth, a cellular telephone RAT such as a 3G, 4G, or 5G NR FR1 RAT, etc. As another example control RAT 60 may be an infrared communications RAT (e.g., where an infrared remote control or infrared emitters and sensors use infrared light to convey signals for the control RAT between UE device 10, AP 34, and/or RIS 50).

AP 34 and RIS 50 may use control RAT 60 to convey radio-frequency signals 68 (e.g., control signals) between AP 34 and RIS 50. UE device 10 and RIS 50 may use control RAT 60 to convey radio-frequency signals 70 (e.g., control signals) between UE device 10 and RIS 50. UE device 10, AP 34, and RIS 50 may use data RAT 62 to convey wireless signals 46 via reflection off antenna elements 48 of RIS 50. The wireless signals may be reflected, via the first RIS beam and the second RIS beam formed by RIS 50, between AP 34 and UE device 10. AP 34 may use radio-frequency signals 68 and control RAT 116 and/or UE device 10 may use radio-frequency signals 70 and control RAT 116 to discover RIS 50 and to configure antenna elements 48 to establish and maintain the relay of wireless signals 32 performed by antenna elements 48 using data RAT 62.

If desired, AP 34 and UE device 10 may also use control RAT 60 to convey radio-frequency signals 72 directly with each other (e.g., since the control RAT operates at lower frequencies that do not require line-of-sight). UE device 10 and AP 34 may use radio-frequency signals 72 to help establish and maintain THF communications (communications using data RAT 62) between UE device 10 and AP 34 via RIS 50. AP 34 and UE device 10 may also use data RAT 62 to convey wireless signals 46 directly (e.g., without reflection off RIS 50) when a LOS path is available.

If desired, the same control RAT 60 may be used to convey radio-frequency signals 68 between AP 34 and RIS 50 and to convey radio-frequency signals 70 between RIS 50 and UE device 10. If desired, AP 34, RIS 50, and/or UE device 10 may support multiple control RATs 60. In these scenarios, a first control RAT 60 (e.g., Bluetooth) may be used to convey radio-frequency signals 68 between AP 34 and RIS 50, a second control RAT 60 (e.g., Wi-Fi) may be used to convey radio-frequency signals 70 between RIS 50 and UE device 10, and/or a third control RAT 60 may be used to convey radio-frequency signals 72 between AP 34 and UE device 10. Processing procedures (e.g., work responsibilities) may be divided between data RAT 62 one or more control RAT 60 during discovery, initial configuration, data RAT communication between UE device 10 and AP 34 via RIS 50, and beam tracking of UE device 10.

AP 34 may require internet access, a power connection, implementation of a full WLAN protocol and, in the case of a relay or mesh configuration, transfers may require handling of two links (base station and user links). In many environments, obstacles such as walls or furniture may block a LOS path to the AP. Disposing many AP's within the environment to cover all areas of the environment despite the obstacles can be unnecessarily expensive, can consume an excessive amount of resources, and may not be possible given the power outlets or connectivity available for access points in each of the areas. Further, a single RIS 50 may not be able to provide a single AP with coverage for all areas of the environment. As such, AP 34 may need to use multiple RIS's 50 to be able to communicate with UE devices located in all areas of the environment. The AP may not have a LOS path to all of the multiple RIS's. As such, multiple RIS's may be arranged in a relay configuration in which a chain of multiple RIS's serve as a communication link to route (reflect) wireless data between the AP and a UE device.

Figure 3:
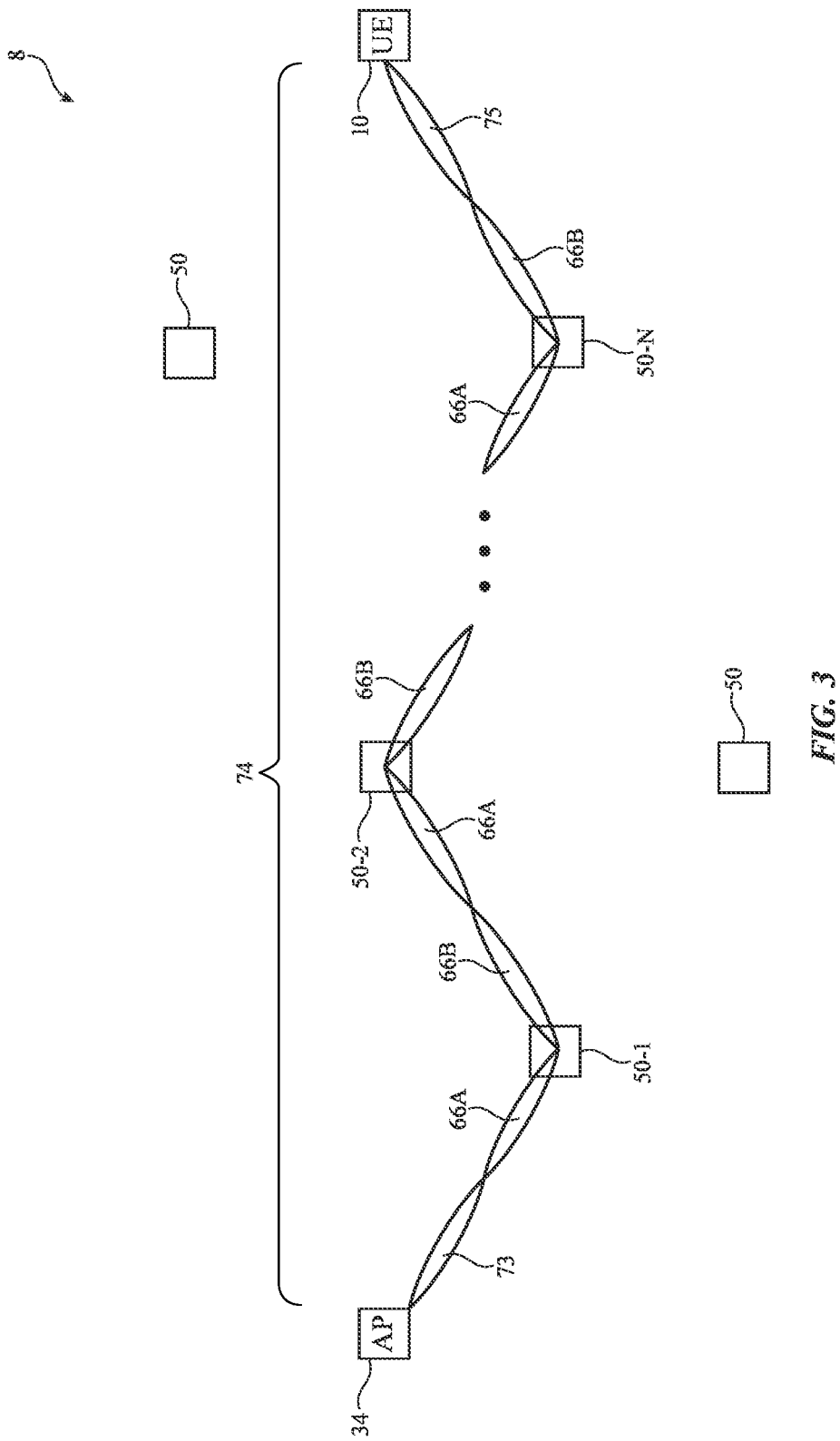
FIG. 3 is a diagram showing how a wireless access point may communicate with a user equipment device via an illustrative communication path having multiple RIS's that relay signals in accordance with some embodiments.

FIG. 3 is a diagram showing one example of how multiple RIS's may be arranged in a relay configuration to form a communication link that routes wireless data between AP 34 and UE device 10. As shown in FIG. 3, AP 34 and UE device 10 may communicate, using data RAT 62, over communication path 74. Communication path 74 may include a set of N RIS's 50, from a first RIS 50-1 with LOS to AP 34 to an Nth RIS 50-N with LOS to UE device 10. N may be an integer greater than or equal to two. System 8 may have other RIS's 50 that do not form part of communication path 74 but which may form part of one or more other communication paths to other potential locations for UE devices in system 8.

The N RIS's 50 in communication path 74 may be arranged in a relay or chain configuration. Each RIS 50 may reflect signals to or from at least one other RIS 50 in communication path 74 (e.g., between AP 34 and a next RIS 50 in the path, between a previous RIS 50 and a next RIS 50 in the path, or between a previous RIS 50 in the path and UE device 10). Each RIS 50 may form a respective first RIS beam 66A pointed towards the previous node (device) in communication path 74 and may concurrently form a respective second RIS beam 66B pointed towards the next node (device) in communication path 74.

For example, as shown in FIG. 3, RIS 50-1 may have a first RIS beam 66A that points towards AP 34. AP 34 may have an AP beam 73 that points towards RIS 50-1 (e.g., overlapping the first RIS beam 66A of RIS 50-1). RIS 50-1 may also have a second RIS beam 66B that points towards the next RIS 50 in communication path 50, RIS 50-2. RIS 50-2 may have a first RIS beam 66A that points towards the previous RIS 50 in communication path 50, RIS 50-1 (e.g., overlapping the second RIS beam 66B of RIS 50-1). RIS 50-2 may also have a second RIS beam 66B that points towards the next RIS 50 in communication path 50. This relay configuration may continue until RIS 50-N. RIS 50-N may have a first RIS beam 66A pointed towards the previous RIS 50 in communication path 50 (e.g., RIS 50-(N−1)). RIS 50-N may have a second RIS beam 66B pointed towards UE device 10. UE device 10 may have a UE beam 75 that points towards RIS 50-N.

The first RIS 50 in communication path 74, which is the RIS closest to AP 34 (e.g., RIS 50-1), may sometimes be referred to herein as the AP RIS of communication path 74. The Nth RIS 50 in communication path 74, which is the RIS closest to UE device 10 (e.g., RIS 50-N), may sometimes be referred to herein as the end user RIS of communication path 74. If desired, some of the RIS's in system 8 may be configured to operate as end user RIS's for one or more communication paths 74 whereas other RIS's in system 8 are configured to operate as routing RIS's. Routing RIS's are used to relay wireless signals 46 to/from other RIS's but not to end user 50 (e.g., RIS's 50-1 through 50-(N−1) may be routing RIS's).

End user RIS's are used to relay wireless signals between a routing RIS and a UE device 10. UE device 10 may move and rotate over time (e.g., as the UE device is operated by an end user). End user RIS's therefore also need to perform tracking on the UE device to update the second beam 66B of the end user RIS as the UE device 10 moves relative to the end user RIS over time. The tracking may also involve updating the UE beam of UE device 10 so the UE beam continues to point towards the end user RIS as the UE device moves/rotates over time. As such, the end user RIS's may have wider RIS beams than routing RIS's, if desired. This may configure the end user RIS's to allow for more movement of UE device 10 before losing a beam (e.g., because the distance between end user RIS's and the UE device is generally smaller than the distance between the UE device and the AP). On the other hand, using narrower RIS beams for the routing RIS's may help to mitigate path loss and can easily bridge several rooms. Since RIS beams of the routing RIS's only need to reflect signals between other RIS's (or a RIS and AP 34), and the RIS's and the AP are fixed in place after installation within system 8, the routing RIS's do not need to update their RIS beams after being installed and set up (calibrated).

Figure 4:
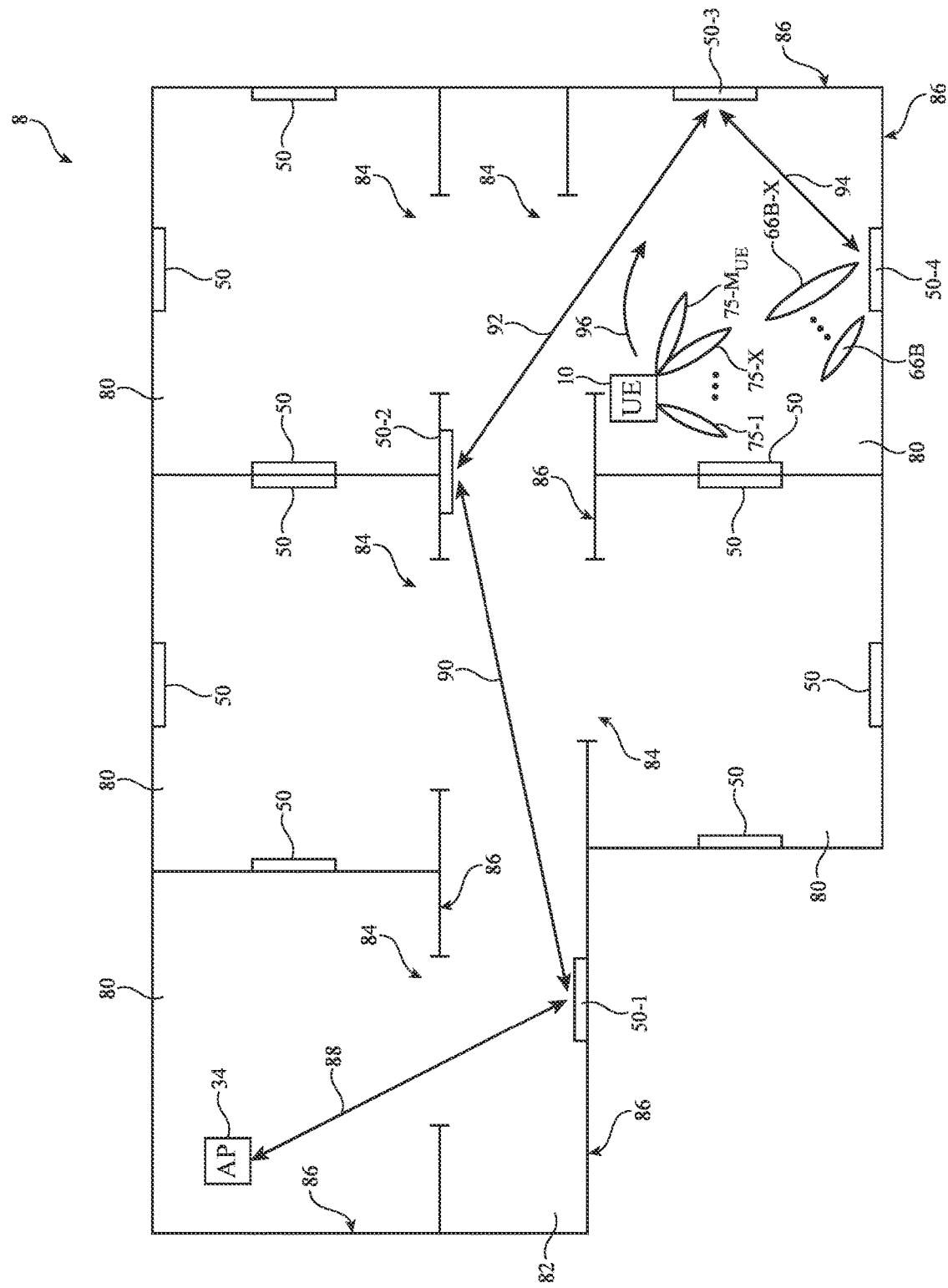
FIG. 4 is a top view of an illustrative environment having multiple RIS's mounted in different areas of the environment for providing communication paths from each of areas to a wireless access point via multiple RIS's in accordance with some embodiments.

FIG. 4 is a top view of an exemplary environment in which system 8 may be deployed for providing communication paths such as communication path 74 between AP 34 and UE devices. As shown in FIG. 4, system 8 may include a building having different areas 80 (e.g., rooms) joined by a common area 82 (e.g., a hallway). Areas 80 and 82 may be bounded and divided by obstacles 86. Obstacles 86 may include walls, the floor, the ceiling, doors, windows, cubicle walls, furniture, etc.

AP 34 may be disposed within a first area 80. UE device 10 may be located in a second area 80 that is separated from the first area 80 by at least area 82. If desired, radio-frequency transparent windows 84 may be present between each area 80 and area 82 to allow for the passage of radio-frequency signals. Radio-frequency transparent windows 84 may include doorways, entranceways, or openings in obstacles 86 through which a user can pass while moving through the environment, may include radio-frequency transparent paneling or windows in obstacle 86, etc. In some implementations, radio-frequency transparent windows 84 may be formed in the top of walls of the building where the walls meet the ceiling. This may allow signals to be routed through the windows with minimal risk of being blocked by people or other objects on the floor in the building, and can simplify routing for communication path 74 (e.g., to within a two-dimensional plane instead of a three-dimensional space).

Each area 80 and area 82 may include at least one RIS 50 disposed therein. If desired, RIS's 50 may be mounted to obstacles 86 (e.g., walls, a portion of the walls that meet the ceiling, etc.). The RIS's in areas 80 may, if desired, be configured as end user RIS's whereas the RIS's in area 82 may be configured as routing RIS's. If desired, dedicated routing RIS's may be provided for each area 80 and/or for each end user RIS that is placed. This may, for example, help to ensure that the routing RIS can be pre-configured without any further control overhead required to change its active RIS beams. If desired, several end user RIS's may be placed in each area 80 to ensure optimum connection to a UE device while the UE device is in motion. If desired, a routing RIS may concurrently serve several areas 80, although an additional connection to the AP via an additional long range power interface may be needed. When located in the second area 80, as shown in FIG. 4, UE device 10 does not have a LOS to AP 34. As such, N RIS's 50 may be used to relay wireless signals 46 between UE device 10 and AP 34 (e.g., through windows 84 and around obstacles 86).

In the example of FIG. 4, N is equal to 4. UE device 10 may have a LOS to 50-4 (e.g., the end user RIS for UE device 10), which has a LOS to RIS 50-3 in the second area 80, which has a LOS to RIS 50-2 in common area 82, which has a LOS to RIS 50-1 in common area 50-1, which has a LOS to AP 34 in the first area 80. RIS's 50-1, 50-2, 50-3, and 50-4 may thereby be used to form communication path 74 (FIG. 3) between AP 34 and UE device 10 while UE device 10 is at the location shown in FIG. 4.

In general, all of the RIS's 50 in the environment may be calibrated (e.g., after or upon installation) to have knowledge of which RIS beams to use to direct wireless signals to each other visible RIS in the system. As such, RIS 50-4 has knowledge of which of its RIS beams points towards RIS 50-3 (as well as all other RIS's 50 with a LOS to RIS 50-4). Similarly, RIS 50-3 is calibrated to have knowledge of which of its RIS beams point towards RIS 50-2 and which of its RIS beams points towards RIS 50-4 (as well as all other RIS's 50 with a LOS to RIS 50-4), RIS 50-2 is calibrated to have knowledge of which of its RIS beams point towards RIS 50-1 and which of its RIS beams points towards RIS 50-3 (as well as all other RIS's 50 with a LOS to RIS 50-4), and RIS 50-1 is calibrated to have knowledge of which of its RIS beams points towards RIS 50-2 and which of its RIS beams points towards AP 34.

To perform wireless communication over the communication path 74 from AP 34 to UE device 10 of FIG. 4, UE device 10 first needs to connect to the end user RIS. This may involve a discovery procedure in which UE device 10 sweeps over different UE beams until a UE beam pointing towards a satisfactory end user RIS such as RIS 50-4 is found and in which the end user RIS such as RIS 50-4 sweeps over different RIS beams until a RIS beam pointing towards UE device 10 is found. UE device 10 may, for example, have $M_{UE}$ different formable UE beams 75 (e.g., from UE beam 75-1 to UE beam 75-$M_{UE}$, as given by the UE codebook). Each UE beam 75 points in a different direction. Similarly, RIS 50-4 may have a set of different formable RIS beams 66 (only the RIS beams used to form the second beam 66B for pointing towards UE device 10 are shown in FIG. 4 for the sake of clarity). The discovery operation may allow UE device 10 to discover its UE beam 75-X pointing towards RIS 50-4 and may allow RIS 50-4 to discover its RIS beam 66B-X pointed towards UE device 10.

If desired, once UE device 10 has connected to the end user RIS (e.g., RIS 50-4), UE device 10, AP 34, and/or RIS 50-4 may control each of the other RIS's in communication path 74 to form the appropriate RIS beams that are used to form communication path 74. In other implementations (e.g., when each routing RIS is used to serve only a single area 80 or a single set of end user RIS's such as end user RIS's of a single area 80), the other RIS's in the communication path need not be controlled to form the required RIS beams after initial calibration is completed, since those RIS's may always form the same RIS (static) beams that serve their corresponding area(s).

During wireless communication over communication path 74, UE device 10 may use the data RAT to transmit wireless signals 46 (FIG. 1) within UE beam 75-X towards RIS 50-4. RIS 50-4 may receive the wireless signals over its second RIS beam 66B pointed towards UE device 10 (e.g., RIS beam 66B-X). RIS 50-4 concurrently forms its first RIS beam 66A oriented towards RIS 50-3 (e.g., where the angle of the first RIS beam 66A oriented towards RIS 50-3 is known from the calibration of the system). As such, RIS 50-4 reflects the wireless signals from its second RIS beam 66B-X and onto its first RIS beam 66A and towards RIS 50-3, as shown by arrow 94.

RIS 50-3 may receive the wireless signals over its second RIS beam 66B pointed towards RIS 50-4 (e.g., in the direction of arrow 94, where the angle of the second RIS beam 66B oriented towards RIS 50-4 is known from calibration of the system). RIS 50-3 concurrently forms its first RIS beam 66A oriented towards RIS 50-2 (e.g., where the angle of the first RIS beam 66A oriented towards RIS 50-2 is known from the calibration of the system). As such, RIS 50-3 reflects the wireless signals from its second RIS beam 66B and onto its first RIS beam 66A and towards RIS 50-2, as shown by arrow 92.

RIS 50-2 may receive the wireless signals over its second RIS beam 66B pointed towards RIS 50-3 (e.g., in the direction of arrow 92, where the angle of the second RIS beam 66B oriented towards RIS 50-3 is known from calibration of the system). RIS 50-2 concurrently forms its first RIS beam 66A oriented towards RIS 50-1 (e.g., where the angle of the first RIS beam 66A oriented towards RIS 50-1 is known from the calibration of the system). As such, RIS 50-2 reflects the wireless signals from its second RIS beam 66B and onto its first RIS beam 66A and towards RIS 50-1, as shown by arrow 90.

RIS 50-1 may receive the wireless signals over its second RIS beam 66B pointed towards RIS 50-2 (e.g., in the direction of arrow 90, where the angle of the second RIS beam 66B oriented towards RIS 50-2 is known from calibration of the system). RIS 50-1 concurrently forms its first RIS beam 66A oriented towards AP 34 (e.g., where the angle of the first RIS beam 66A oriented towards AP 34 is known from the calibration of the system). As such, RIS 50-1 reflects the wireless signals from its second RIS beam 66B and onto its first RIS beam 66A and towards AP 34, as shown by arrow 90. AP 34 receives the wireless signals in its AP beam, which is oriented in the direction of arrow 88 (e.g., where the angle of the AP beam oriented towards RIS 50-1 is known from the calibration of the system). Arrows 88, 90, 92, and 94 and the link from UE device 10 to RIS 50-4 may collectively characterize/support communication path 74 (FIG. 3) for UE device 10 at this location.

Conversely, AP 34 may use the data RAT to transmit wireless signals 46 within its AP beam towards RIS 50-1. RIS 50-1 may receive the wireless signals from AP 34 in its first RIS beam 66A (oriented in the direction of arrow 88) and may reflect the wireless signals towards RIS 50-2 in its second RIS beam 66B (oriented in the direction of arrow 90). RIS 50-2 may receive the wireless signals from RIS 50-1 in its first RIS beam 66A (oriented in the direction of arrow 90) and may reflect the wireless signals towards RIS 50-3 in its second RIS beam 66B (oriented in the direction of arrow 92). RIS 50-3 may receive the wireless signals from RIS 50-2 in its first RIS beam 66A (oriented in the direction of arrow 92) and may reflect the wireless signals towards RIS 50-3 in its second RIS beam 66B (oriented in the direction of arrow 92). RIS 50-4 may receive the wireless signals from RIS 50-3 in its first RIS beam 66A (oriented in the direction of arrow 94) and may reflect the wireless signals towards UE device 10 in its second RIS beam 66B-X.

In this way, multiple RIS's 50 in system 8 may be used to reflect and relay wireless signals 46 between AP 34 and UE device 10. UE device 10 may also move or rotate over time, as shown by arrow 96. As such, the end user RIS (e.g., RIS 50-4) and UE device 10 need to perform UE tracking over time to update the UE beam and the second RIS beam 66B of RIS 50-4, and/or to switch a different end user RIS into use over time. However, since the configuration (e.g., RIS beams) of the routing RIS's are already set on calibration and the RIS's 50 and AP 34 do not move after installation, only the active end user RIS, the second RIS beam of the active end user RIS, and/or the UE beam need to be updated to track movement of UE device 10 over time. The example of FIG. 4 is illustrative and non-limiting and, in general, the environment may have any number of areas of any sizes or shapes and any number of RIS's arranged in any desired manner. The AP may concurrently communicate with multiple UE devices in the environment using different respective communication paths 74, which may include different RIS's 50 or may include one or more of the same RIS's 50.

Figure 5:
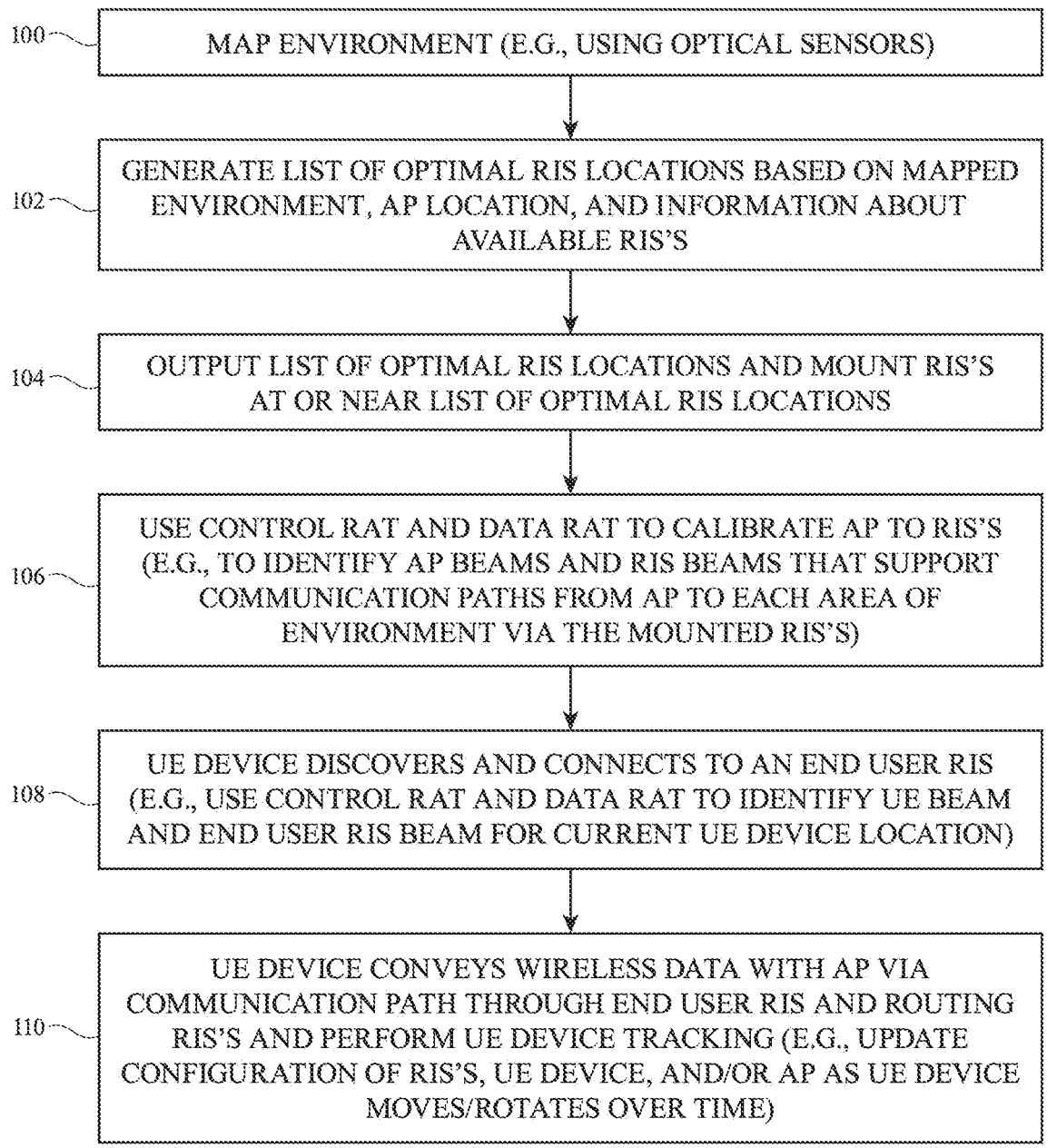
FIG. 5 is a flow chart of illustrative operations involved in establishing and operating a system having a wireless access point and multiple RIS's mounted in different areas for providing communication paths from each of areas to a wireless access point in accordance with some embodiments.

FIG. 5 is a flow chart of illustrative operations involved with setting up and operating system 8 of FIG. 4. At operation 100, a calibration device may generate a three-dimensional or two-dimensional map of the environment of system 8. The calibration device may be a UE device such as UE device 10 or a different mapping device. The calibration device may be operated by an administrator of the system.

The calibration device may, for example, include an optical sensor such as a light detection and ranging (lidar) sensor that transmits light and receives the light after reflection off different points in an area to map the distance between the calibration device and each point, thereby generating a spatial map of the area. In other examples, the calibration device may include ultra-wideband (UWB) antennas that maps the areas using UWB signals transmitted to UWB tags distributed throughout the environment. The calibration device may generate such a map for all areas 80 and 82 of the environment. If desired, the calibration device may be omitted and a pre-drawn map or floor plan (file) of the environment may be used for subsequent processing.

At operation 102, a software application running on the calibration device, AP 34, or elsewhere (e.g., as executed by one or more processors) may generate (output) a list of optimal locations for RIS 50 in the environment based on the maps generated while processing operation 100, information about the environment (e.g., a floor plan or room plan), the location of AP 34, and/or information about the RIS's (e.g., the number and capability of each of the available RIS's 50 to be deployed in the environment). If desired, the application may treat walls in the environment as perfect reflectors (e.g., where the incident angle of a radio-frequency wave is equal to the output angle of the radio-frequency wave as reflected off the wall) plus some angular variation x. The amount of angular variation x should be kept as small as possible to keep the effects of beam damping low.

The optimal locations output by the application algorithm may, for example, be locations such that AP 34 is able to cover, via the available RIS's, each part of every area in the environment using a minimal number of RIS's and a minimal deviation x from perfect reflection. The algorithm may also account for obstacles and other RIS elements. The application may, for example, use ray-tracing algorithms creating a large set of solutions for the locations, which may be weighted according to the above set of parameters. If desired, the optimal positions may be located at or close to the ceiling of the environment, to help avoid obstacles in the LOS paths, to ease passage of the signals through windows 84 of FIG. 4 (e.g., doorways, glass openings transparent to wireless signals 46, false ceilings, etc.). Selecting optimal positions at or close to the ceiling may, for example, simplify the placement optimization to a two-dimensional routing problem instead of a three-dimensional routing problem (e.g., only the UE device and the end user RIS may need to incorporate the third dimension), reducing the amount of time required to install and calibrate the system.

At operation 104, the application may output the list of optimal RIS locations to the administrator of the system (e.g., using a display, printer, speaker, or other output device, as a plan or map file to be viewed by the administrator of the system, etc.). The application may also output the optimal beams between each of the routing RIS's used to form communication path 74. The administrator may then place RIS's 50 at or as close as possible to the optimal RIS locations output by the application.

At operation 106, the administrator may use a UE device or other calibration device to calibrate the AP and each of the RIS's installed in the system (e.g., in an initial calibration procedure). The calibration may involve discovering, within a relatively small angular variation around the pre-calibrated optimal beams output by the application, the first RIS beam 66A and the second RIS beam 66B for each RIS 50 in the system to support each of the communication links 74 formable by the system (e.g., to support communication links 74 for UE devices 10 located in each of the areas 80 of the environment). In other words, the calibration, which is described in further detail below, may involve discovering RIS beams for each of the RIS's that point towards each of the other RIS's that are visible to each RIS, each of the RIS beams that point towards AP 34 (e.g., for RIS's with LOS to AP 34), as well as the AP beam(s) pointing to one or more RIS's 50 in the system.

The calibration may be performed using both the control RAT and the data RAT if desired. The calibration may also involve using the control RAT to instruct each of the routing RIS's of their RIS beams to be used, each of the end user RIS's of their RIS beams to be used that point towards one or more routing RIS's, and/or to instruct AP 34 of the AP beam(s) to be used. The control RAT may also be used to actively configure the routing RIS's to form their corresponding discovered first RIS beam 66A and second RIS beam 66B, as well as to configure the end user RIS's to form their first RIS beam 66A in a suitable direction oriented towards a corresponding routing RIS. The RIS's are then pre-configured (calibrated) to relay wireless signals from each area 80 upon connection of a UE device 10 to an end user RIS 50 during a subsequent transfer mode. No further active (control) communication between the AP and routing RIS's is required (e.g., for configuring beams of the routing RIS's) after the initial setup and calibration, thus minimizing power consumption for the AP and the routing RIS's.

At operation 108, UE device 10 may enter an area 80 and may wish to communicate with AP 34. The UE device may discover and connect to an end user RIS in its area. For example, the UE device may use the control RAT to connect to its closest end user RIS. The discovery may involve discovering the UE beam pointed towards the end user RIS and may involve discovering the second RIS beam of the end user RIS pointed towards the UE device. For example, in the deployment of FIG. 4, UE device 10 may discover that UE beam 75-X points towards end user RIS 50-4 and end user RIS 50-4 may discover that second RIS beam 66B-X points towards UE device 10.

UE device 10 and the end user RIS may perform this discovery while splitting procedures (e.g., processing responsibilities) between the control RAT and the data RAT if desired. For example, the UE device and the end user RIS may use the control RAT to coordinate sweeping over UE beams and/or second RIS beams of the end user RIS while UE device 10 and/or AP 34 transmits wireless signals 46 (using the data RAT) that are reflected off RIS 50-4. UE device 10 and/or AP 34 may gather wireless performance metric data associated with the reflected signals and may select the UE beam and the second RIS beam of the end user RIS that produced optimal wireless performance data (e.g., peak wireless performance metric data, wireless performance metric data that exceeded a threshold, etc.) as the discovered UE beam pointed towards the end user RIS (e.g., UE beam 75-X of FIG. 4) and the discovered second RIS beam for the end user RIS (e.g., RIS beam 66B-X of FIG. 4). The wireless performance metric data may include received power level values, signal-to-noise ratio (SNR) values, noise floor values, error rate values, or any other desired values characterizing wireless performance. This procedure may also be performed across multiple candidate end user RIS's to select the end user RIS to use.

The control RAT may be used to instruct UE device 10 and/or AP 34 of the discovered (optimal) UE beam and the discovered (optimal) second RIS beam. The control RAT may also be used to inform the end user RIS (e.g., RIS 50-4 of FIG. 4) of the discovered second RIS beam and/or to actively configure the end user RIS to form the discovered second RIS beam as its second RIS beam 66B (FIG. 3). Once the UE beam and the second RIS beam of the end user RIS have been established, the UE device may use the control RAT to place the end user RIS into a transfer mode (e.g., from an initialization mode, calibration mode, or back-reflection mode). In the transfer mode, the end user RIS may concurrently form its first RIS beam pointed towards the previous RIS 50 in communication path 74. AP 34 may continuously listen for incoming signals via the routing RIS(s) to detect the presence of the new UE device 10 and to begin data transfer.

At operation 110, UE device 10 and AP 34 may then convey wireless data via reflection (hops or bounces) of wireless signals 46 off each of the N RIS's 50 in communication path 74 (e.g., using the pre-calibrated and configured first and second RIS beams for each of the routing RIS's in the communication path, using the pre-calibrated and configured first RIS beam for the end user RIS in the communication path, using the pre-calibrated AP beam for AP 34, using the discovered second RIS beam for the end user RIS, and using the discovered UE beam pointed towards the end user RIS).

At the same time, UE device 10, AP 34, and/or the end user RIS may track the location of UE device 10 as the UE device moves over time. This may involve updating the UE beam, the second RIS beam of the end user RIS, and/or the active end user RIS over time based on the orientation/position of UE device 10. As one example, UE device 10 and/or the end user RIS may periodically attempt to communicate using different UE beams and/or different second RIS beams to see if any of the beams exhibit superior performance to the current beams. This may involve, for example, periodically sweeping UE device 10 over a set of UE beams (e.g., all UE beams or a subset of the UE beams around the current UE beam) and/or periodically sweeping the end user RIS and/or other end user RIS's over second RIS beams (e.g., all second RIS beams or a subset of the second RIS beams around the current second RIS beam).

If desired, sensor data gathered by UE device 10 and/or other sensors in the system may be used to perform or supplement UE tracking. For example, UE device 10 (or a sensor elsewhere) may gather sensor data indicative of the movement of UE device 10 (e.g., accelerometer data, motion sensor data, compass data, satellite navigation data, light sensor data, gyroscope data, etc.). UE device 10 may use information about its current location or movement to preemptively update its UE beam (e.g., to a UE beam that points towards the end user RIS given its movement or new location or to perform a sweep of UE beams around a UE beam expected to be optimal given its movement or new location) and/or may use the control RAT to instruct the end user RIS to update the second RIS beam of the end user RIS based on this information (e.g., to a second RIS beam that points towards the UE device given its movement or new location or to perform a sweep of second RIS beams around the expected location of the UE device). Augmenting tracking using sensor data may help to reduce the amount of time required to update the UE beam and second RIS beam of the end user RIS, thereby minimizing disruptions in communication as the UE device moves. Since all steps in communication path 74 except for the final link between the end user RIS and UE device 10 (e.g., over UE beam 75 and the second RIS beam 66B of the end user RIS) are pre-calibrated and configured during operation 106, the other RIS's in the system need not be controlled further while the system tracks UE device 10.

Figure 6:
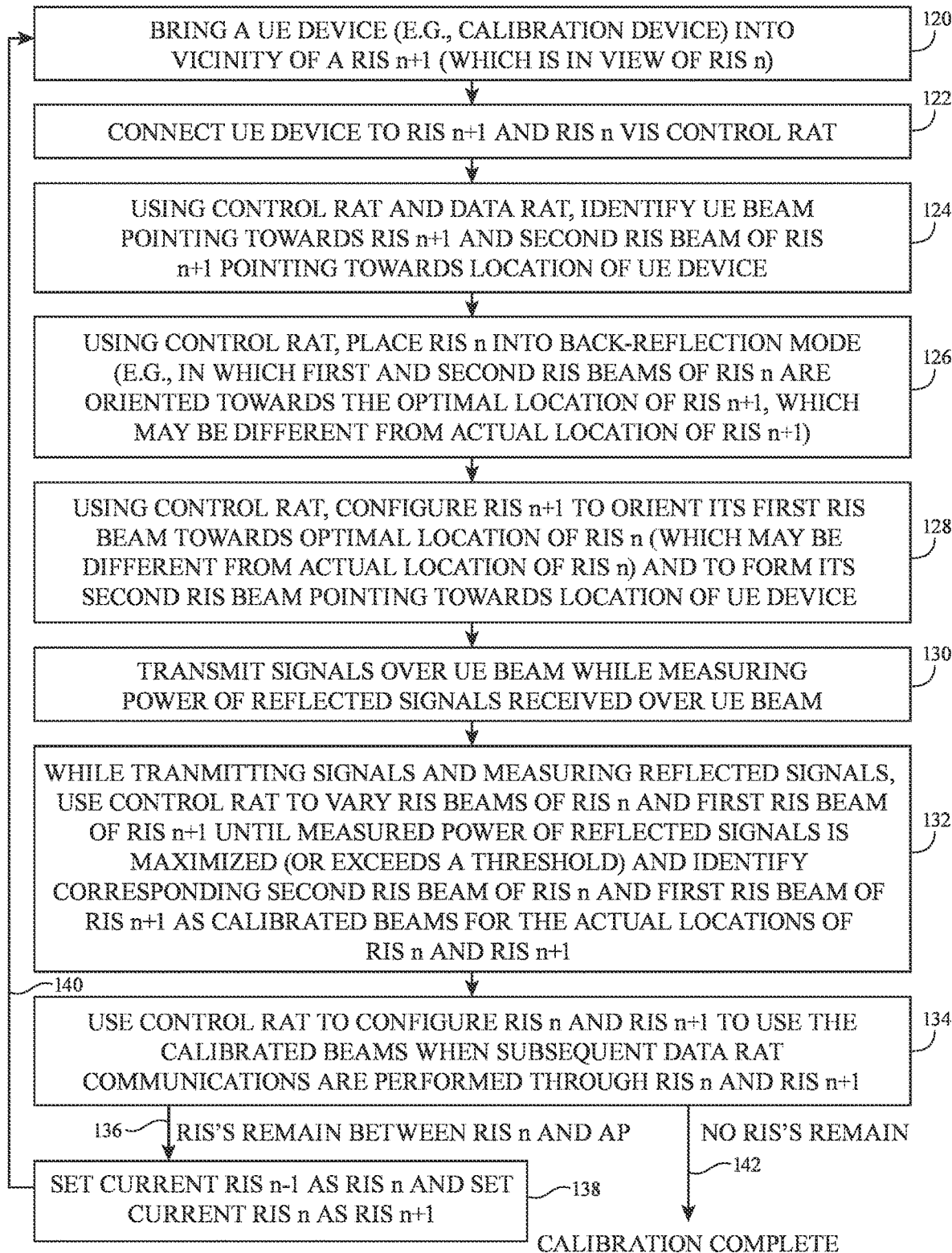
FIG. 6 is a flow chart of illustrative operations involved in calibrating the RIS's in a system having a wireless access point and multiple RIS's mounted in different areas for providing communication paths from each of areas to a wireless access point in accordance with some embodiments.

FIG. 6 is a flow chart of illustrative operations involved in calibrating the RIS's 50 and AP 34 after (upon) installation in the environment. These calibration operations may help to mitigate any deviation in the actual placement of RIS's 50 from the optimal RIS locations identified while processing operation 104 of FIG. 5 (e.g., to ensure that each RIS has RIS beams pointing in the correct directions for forming communication paths 74 and/or to overcome angular variation x). The operations of FIG. 6 are, for example, performed while processing operation 106 of FIG. 4 and may, if desired, be re-performed when a geometry of the environment changes, obstacles are added or removed from the environment, etc.

At operation 120, the administrator may bring a calibration device into the vicinity of a first deployed RIS 50 (e.g., an end user RIS). An implementation in which the calibration device is UE device 10 is described herein as an example. The RIS's 50 in the communication path 74 from AP 34 to the end user RIS may be labeled with an index n, from n=1 to n+1=N. Index n may, for example, label the hop distance to AP 34 along the communication path, as well as the order the different RIS's are connected in the communication path. The first deployed RIS 50 may be labeled by index n+1 and may therefore sometimes referred to herein as RIS n+1. During a first iteration of the operations of FIG. 6, RIS n+1 may be the end user RIS 50-N for the corresponding communication path (FIG. 4). RIS n+1 may have a LOS to the previous RIS in communication path 74 (e.g., RIS n). This example is illustrative and conversely, if desired, calibration may equivalently be performed in the opposite order, from the AP to the end user RIS (e.g., during a first iteration of the operations of FIG. 6, RIS n+1 may be the AP RIS 50-1 for the corresponding communication path, where the index order for n is reversed).

At operation 122, UE device 10 may use the control RAT to connect to RIS n+1 and RIS n.

At operation 124, UE device 10 may use the control and the data RAT to identify a UE beam that points from the current location of UE device 10 towards RIS n+1 and to identify the second RIS beam of RIS n+1 that points toward UE device 10. UE device 10 may, for example, identify the UE beam and the second RIS beam using similar beam sweeping and data RAT transmission/measurement procedures as performed at operation 108 of FIG. 5.

At operation 126, UE device 10 may use the control RAT to place RIS n into a back-reflection mode. Prior to calibration, each RIS may have knowledge of the optimal (ideal) locations of each of the other RIS's in the system (e.g., as given by the map/list output at operation 104 of FIG. 5). However, each RIS does not have knowledge of the actual locations of each of the RIS's, which may differ from the optimal locations.

In the transfer mode, prior to calibration, RIS n may have a first RIS beam pointed towards the optimal location of RIS n−1 (e.g., the previous RIS in communication path 74) and may have a second RIS beam pointed towards the optimal location of RIS n+1. On the other hand, in the back-reflection mode, prior to calibration, both the first RIS beam and the second RIS beam are pointed towards the optimal location of RIS n+1.

At operation 128, UE device 10 may use the control RAT to configure RIS n+1 to orient its first RIS beam 66A towards the optimal location of RIS n (e.g., as given by the map/list output at operation 104 of FIG. 5). UE device 10 may also use the control RAT to configure RIS n+1 to form its second RIS beam 66B towards the location of UE device 10 (e.g., as identified at operation 124).

At operation 130, UE device 10 may use the data RAT to transmit signals (e.g., calibration or test signals) over the UE beam oriented towards RIS n+1. RIS n+1 may receive the signals over its second RIS beam 66B and may reflect the signals over its first RIS beam 66A oriented towards the optimal location of RIS n. Since RIS n is configured in the back-reflection mode, any of the signals that are incident within the second RIS beam 66B of RIS n will be reflected back in in the same direction (e.g., towards RIS n+1) via its first RIS beam 66A. RIS n+1 may then reflect these reflected signals from its first RIS beam 66A onto its second RIS beam 66B and towards UE device 10. UE device 10 may gather wireless performance metric data from the received reflected signals while transmitting the signals. The wireless performance metric data may include measured (received) power levels, for example.

At operation 132, while transmitting signals and measuring reflected signals, UE device 10 may use the control RAT to control RIS n to vary (e.g., sweep) its first RIS beam 66A and its second RIS beam 66B (pointed towards RIS n+1) and/or to control RIS n+1 to vary (sweep) its first RIS beam 66A (pointed towards RIS n). Since the optimal positions of RIS n and/or RIS n+1 might vary from the actual positions of the RIS's, this variation may help to mitigate any misalignment between actual and optimal positions until RIS beams are found that produce peak reflection back towards UE device 10.

UE device 10 may continue this process until the measured power levels of the reflected signals are maximized or exceed a threshold value, which is indicative of the first RIS beam 66A of RIS n+1 pointing towards the actual location of RIS n, and the first and second RIS beams of RIS n pointing towards RIS n+1. UE device 10 may identify the first RIS beam 66A of RIS n+1 that produced the maximum reflected power level as the calibrated first RIS beam 66A for RIS n+1 (e.g., for use during subsequent transfer mode operations via the data RAT). UE device 10 may identify the second RIS beam of RIS n that produced the maximum reflected power level as the calibrated second RIS beam 66B for RIS n (e.g., for use during subsequent transfer mode operations via the data RAT).

At operation 134, UE device 10 may use the control RAT to configure RIS n+1 to use its calibrated first RIS beam 66A during transfer mode. UE device 10 may also use the control RAT to configure RIS n to use its calibrated second RIS beam 66B during transfer mode. These calibrated beams may be oriented towards the actual positions of the RIS's even if the actual positions deviate from the optimal positions as initially mapped.

If RIS's remain in communication path 74 to calibrate, processing may proceed to operation 136. At operation 138, UE device 10 may move one RIS closer to AP 34 up the chain of RIS's in communication path 74 device. As such, UE device 10 may set the current RIS n−1 as the RIS n for the next iteration of operations 120-136 and may set the current RIS n as the RIS n+1 for the next iteration of operations 120-136. Processing may then loop back to operation 120 via path 140. This may continue sequentially up each pair of RIS's 50 in communication path 74 until each RIS 50 in communication path 74 has been calibrated. This example is illustrative and non-limiting and, if desired, the RIS's may be calibrated in the reverse order (e.g., where the indices are reversed and decrease from the AP towards the end user RIS). For example, AP RIS 50-1 may form the RIS n+1 during the first iteration of FIG. 6, RIS 50-2 may form the RIS n during the first iteration of FIG. 6, UE device 10 may set RIS 50-2 as the RIS n+1 and RIS 50-3 as the RIS n during the second iteration of FIG. 6, and calibration may continue sequentially up each pair of RIS's 50 in communication path 74 from the AP to the end user RIS until communication path 74 has been calibrated. Performing calibration in this direction may, for example, be particularly convenient with the mounting process with which a user deploys the system (e.g., beginning at the AP and walking outward along different potential communication paths mounting RIS's in the environment), as the user may calibrate each new RIS as the user places the RIS in the environment before placing the next RIS. When no RIS's remain in the communication path, calibration is complete (path 142) and processing may proceed to operation 108 of FIG. 5. The operations of FIG. 6 may be performed (e.g., repeated) for each deployed end user RIS in the environment (e.g., for each possible communication path 74 or at least once for each area 80) until the entire system has been calibrated.

Figure 7:
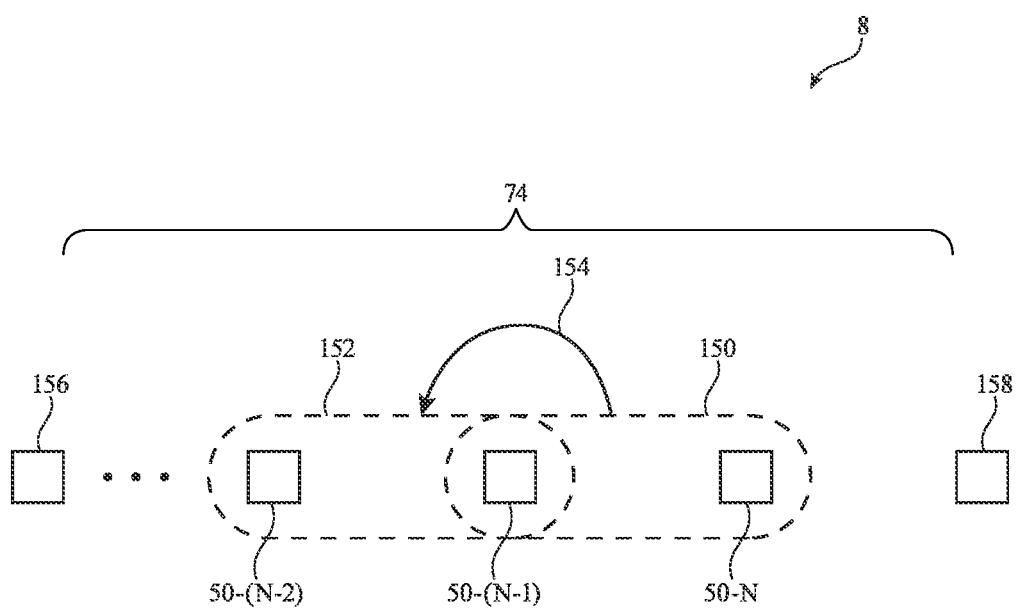
FIG. 7 is a diagram showing how different pairs of RIS's in a communication path may be sequentially calibrated in accordance with some embodiments.

FIG. 7 is a diagram showing how the RIS's 50 in communication path 74 may be calibrated in sequential pairs beginning from a first RIS with a LOS to a first device 156 (e.g., UE device 10 or AP 34) to an Nth RIS with a LOS to a second device 158 (e.g., AP 34 or UE device 10). As shown in FIG. 7, during a first iteration of FIG. 6, UE device 10 may first calibrate a first pair 150 of RIS's such as RIS 50-N and RIS 50-(N−1). In other words, RIS 50-N may form RIS n+1 and RIS 50-(N−1) may form RIS n. Once RIS 50-N and RIS 50-(N−1) have been calibrated, RIS 50-(N−1) is configured to form a second RIS beam 66B pointed towards the actual location of RIS 50-N and RIS 50-N is configured to form a first RIS beam 66A pointed towards the actual location of RIS 50-(N−1).

During a second iteration of FIG. 6, UE device 10 may then calibrate a second pair 152 of RIS's such as RIS 50-(N−1) and RIS 50-(N−2). In other words, RIS 50-(N−1) may form RIS n+1 and RIS 50-(N−2) may form RIS n. Once RIS 50-(N−1) and RIS 50-(N−2) have been calibrated, RIS 50-(N−2) is configured to form a second RIS beam 66B pointed towards the actual location of RIS 50-(N−1) and RIS 50-(N−1) is configured to form a first RIS beam 66A pointed towards the actual location of RIS 50-(N−2). This process may be continued as UE device 10 calibrates communication path 74, two RIS's at a time, up the chain of relayed RIS's (in the direction of arrow 154) until all RIS's in communication path 74 have been calibrated. The connection between AP 34 and the AP RIS in communication path 74 may be established in a similar way. This calibration procedure may only need to be performed once and the short range communication between UE device 10 and the RIS's may be switched off afterwards, thereby conserving battery and power during the subsequent transfer mode operations. If desired, this calibration procedure may be combined with mounting of the routing RIS's, where the user must already move from room-to-room.

During transfer mode operations (e.g., operation 110 of FIG. 5), UE device 10 may move outside of the coverage area of its end user RIS (e.g., RIS 50-4 of FIG. 4). In these situations, a new RIS selection procedure may begin (e.g., using the procedure of operation 108 of FIG. 5). During the new selection of the end-user RIS and establishment of the communication path, no data connection to the AP is available. To keep the service outage as short as possible, UE device 10 may measure the strength of surrounding end-user RIS's while communicating with a given end user RIS, thereby speeding up the search procedure when the UE device moves outside of the coverage area of the given end user RIS. Additionally or alternatively, the UE device may measure its movement as well as selected beams to deduce when the connection will break ahead of time. The UE device may then attempt to select and establish a connection to a new end user RIS (e.g., operation 108 of FIG. 5) prior to the connection breaking, thereby minimizing the service outage.

If desired, the systems and methods described above in connection with FIGS. 1-7 may be extended to situations where one or more AP's 34 in the environment concurrently communicate with multiple UE devices 10 in the same area 80 or in different areas 80 of the environment. In these situations, AP 34 may use time division duplexing (TDD) mechanisms to handle communications with multiple UE devices 10 (e.g., selecting different routes/communication paths that serve different UE devices in different time slots). Additionally or alternatively, AP 34 may use parallel beam forming (e.g., to concurrently form two or more AP beams for two or more routes/communication paths 74 serving two or more different UE devices). If desired, a single end user RIS may use frequency division duplexing (FDD) and/or TDD to serve multiple UE devices located in its area.

UE device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-7 may be performed by the components of UE device 10, RIS 50, and/or AP 34 using software, firmware, and/or hardware (e.g., dedicated circuitry or hardware). Software code for performing these operations may be stored on non-transitory computer readable storage media (e.g., tangible computer readable storage media) stored on one or more of the components of UE device 10, RIS 50, and/or AP 34. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of UE device 10, RIS 50, and/or AP 34. The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of operating a first electronic device to communicate with a second electronic device, the method comprising:
   instructing a first reconfigurable intelligent surface (RIS) to form a first signal beam oriented towards the first electronic device; and
   while the first RIS forms the first signal beam, transmitting wireless data via a first reflection, off the first RIS and towards a second RIS, and via a second reflection, off the second RIS and towards the second electronic device.

2. The method of claim 1, wherein instructing the first RIS to form the first signal beam comprises transmitting, using a first radio access technology (RAT), a control signal to the first RIS.

3. The method of claim 2, wherein transmitting the wireless data comprises transmitting the wireless data using a second RAT that is different from the first RAT.

4. The method of claim 3, wherein the first RAT comprises a wireless local area network (WLAN) RAT or a wireless personal area network (WPAN) RAT and the second RAT involves the transmission of radio-frequency signals at a frequency greater than 10 GHz.

5. The method of claim 1 wherein, while the first electronic device transmits the wireless data, the first RIS forms a second signal beam oriented towards the second RIS and the second RIS forms a third signal beam oriented toward the first RIS.

6. The method of claim 5, further comprising:
   while the first RIS forms the first signal beam and the second signal beam, receiving additional wireless data transmitted by the second electronic device via a third reflection, off the second RIS and towards the first RIS, and via a fourth reflection, off the first RIS and towards the first electronic device.

7. The method of claim 5, further comprising:
   while the first RIS forms the second signal beam, controlling the first RIS to adjust the first signal beam but not the second signal beam.

8. The method of claim 7, further comprising:
   gathering, using one or more sensors, sensor data indicative of motion of the first electronic device, wherein controlling the first RIS to adjust the first signal beam comprises controlling the RIS to adjust the first signal beam based on the sensor data.

9. The method of claim 8, wherein the first electronic device comprises a user equipment device and the second electronic device comprises a wireless access point.

10. A method of operating a communication system to route wireless data between a wireless access point and a user equipment device, the method comprising:
    reflecting, using a first reconfigurable intelligent surface (RIS), the wireless data from a first signal beam onto a second signal beam, the second signal beam oriented towards a second RIS; and
    reflecting, using the second RIS, the wireless data from a third signal beam onto a fourth signal beam, the third signal beam oriented towards the first RIS.

11. The method of claim 10, further comprising:
    adjusting, using the second RIS, the fourth signal beam to point towards the user equipment device.

12. The method of claim 11, wherein the first, second, and third signal beams remain fixed while the second RIS adjusts the fourth signal beam.

13. The method of claim 12, wherein the first, second, and third signal beams are pre-calibrated prior to the communication system routing the wireless data.

14. The method of claim 12, wherein the first signal beam and the second signal beam are narrower than the third signal beam and the fourth signal beam.

15. The method of claim 10, wherein the fourth signal beam is oriented towards the wireless access point.

16. The method of claim 15, wherein the first, second, third, and fourth signal beams are pre-calibrated prior to the communication system routing the wireless data.

17. A method of operating an electronic device, the method comprising:
- transmitting a first control signal that configures a first reconfigurable intelligent surface (RIS) to concurrently form a first signal beam pointed towards the electronic device and a second signal beam pointed in a first direction;
- transmitting a second control signal that configures a second RIS to concurrently form a third signal beam pointed in a second direction and a fourth signal beam pointed in the second direction, the second direction being different from the first direction;
- transmitting, using a fifth signal beam pointed towards the first RIS, a radio-frequency signal; and
- receiving, using the fifth signal beam pointed towards the first RIS, a reflected signal associated with the radio-frequency signal.

18. The method of claim 17, further comprising:
- while the electronic device transmits the radio-frequency signal, transmitting a third control signal that configures the second RIS to sweep over different orientations of the third and fourth signal beams.

19. The method of claim 18, further comprising:
- gathering wireless performance metric data from the reflected signals received using the fifth signal beam;
- identifying, based on the wireless performance metric data, an orientation of the third signal beam that points towards the first RIS; and
- transmitting a fourth control signal to the second RIS that configures the second RIS to point the third signal beam in the identified orientation.

20. The method of claim 17, further comprising
- while the electronic device transmits the radio-frequency signal, transmitting a third control signal that configures the first RIS to sweep over different orientations of the second signal beam;
- gathering wireless performance metric data from the reflected signals received using the fifth signal beam;
- identifying, based on the wireless performance metric data, an orientation of the second signal beam that points towards the second RIS; and
- transmitting a fourth control signal to the first RIS that configures the first RIS to point the second signal beam in the identified orientation.

* * * * *